(12) United States Patent
Stemmler, Jr. et al.

(10) Patent No.: US 6,224,923 B1
(45) Date of Patent: May 1, 2001

US006224923B1

(54) METHOD OF COATING LONG-KEEPING SAUSAGES AND HARD CHEESES

(76) Inventors: Heinz Stemmler, Jr.; Andreas Stemmler, both of Konrad-Adenauer-Ufer 35, Cologne D-50668 (DE)

( * ) Notice: Subject to any disclaimer, the term of this patent is extended or adjusted under 35 U.S.C. 154(b) by 0 days.

(21) Appl. No.: 09/242,185

(22) PCT Filed: Aug. 8, 1997

(86) PCT No.: PCT/EP97/04315

§ 371 Date: Oct. 15, 1999

§ 102(e) Date: Oct. 15, 1999

(87) PCT Pub. No.: WO98/06271

PCT Pub. Date: Feb. 19, 1998

(30) Foreign Application Priority Data

Aug. 9, 1996 (DE) .............................................. 196 32 171

(51) Int. Cl.[7] ...................................................... A23B 4/10

(52) U.S. Cl. ......................... 426/125; 426/105; 426/129; 426/130; 426/135; 426/310; 426/410; 426/415

(58) Field of Search .................................. 426/125, 132, 426/138, 105, 135, 140, 106, 130, 582, 310, 89

(56) References Cited

U.S. PATENT DOCUMENTS

| | | | |
|---|---|---|---|
| 2,285,009 | | 6/1942 | Brubaker et al. . |
| 2,556,278 | * | 6/1951 | Irvine ................... 426/125 |
| 2,812,259 | * | 11/1957 | Mark ..................... 426/125 |
| 2,840,475 | * | 6/1958 | Patten et al. .......... 426/125 |
| 2,849,319 | * | 8/1958 | Weinmann .............. 426/125 |
| 2,864,708 | * | 12/1958 | Tebbens ................. 426/125 |
| 2,909,434 | * | 10/1959 | Patten et al. .......... 426/125 |
| 2,955,043 | * | 10/1960 | Rosenthal .............. 426/125 |
| 2,961,322 | * | 11/1960 | Winterberg ............. 426/125 |
| 3,415,661 | * | 12/1968 | Sincock ................. 426/125 |
| 3,765,907 | * | 10/1973 | Killoran et al. ......... 426/415 |
| 3,886,979 | * | 6/1975 | Rasmussen .............. 426/125 |
| 4,097,623 | * | 6/1978 | Hammer et al. .......... 426/105 |
| 4,283,426 | * | 8/1981 | Schenk et al. ........... 426/105 |
| 4,293,572 | * | 10/1981 | Silva et al. . |
| 4,355,489 | | 10/1982 | Heyer et al. . |
| 4,356,200 | * | 10/1982 | Hammer et al. .......... 426/105 |
| 4,397,337 | * | 8/1983 | Porrmann et al. ........ 426/105 |
| 4,486,200 | | 12/1984 | Heyer et al. . |
| 4,563,376 | * | 1/1986 | Hammer et al. .......... 426/105 |
| 4,661,359 | | 4/1987 | Seaborne et al. . |
| 4,780,326 | | 10/1988 | Stemmler et al. . |
| 4,820,533 | | 4/1989 | Seaborne et al. . |
| 4,855,184 | | 8/1989 | Klun et al. . |
| 4,874,618 | | 10/1989 | Seaborne et al. . |
| 4,917,924 | | 4/1990 | Huang et al. . |
| 4,985,260 | | 1/1991 | Niaura et al. . |
| 5,021,252 | | 6/1991 | Huang et al. . |
| 5,030,486 | | 7/1991 | Huang et al. . |
| 5,032,416 | | 7/1991 | Niaura et al. . |
| 5,049,399 | | 9/1991 | Huang et al. . |
| 5,085,890 | | 2/1992 | Niaura et al. . |

FOREIGN PATENT DOCUMENTS

| | | |
|---|---|---|
| 1417507 | 10/1969 | (DE) . |
| 90559 * | 10/1983 | (EP) . |
| 0366796 | 10/1989 | (EP) . |
| 0382382 | 8/1990 | (EP) . |
| 0503112 | 9/1992 | (EP) . |
| 0867351 | 9/1940 | (FR) . |
| 2355954 | 1/1978 | (FR) . |
| 83-024094 * | 5/1983 | (JP) . |
| 58-107160 * | 6/1983 | (JP) . |
| 61-025465 * | 2/1986 | (JP) . |
| 6-078664 * | 3/1994 | (JP) . |

OTHER PUBLICATIONS

Food Technology Dec. 1986, p. 47 plus copy in 426/138, 1986.*

Clinical Ecology vol. 3 (2) p. 102–105 (Dialog Abstract) (CAB Access # 881407449) File 50, 1985/1986.*

J. Of Agricultural & Food Chem; 39(5) 825–829, 1991.*

* cited by examiner

*Primary Examiner*—Steven Weinstein
(74) *Attorney, Agent, or Firm*—John S. Child, Jr.

(57) ABSTRACT

The present invention relates to a method for coating long-keeping sausages and hard cheese with a composition comprising shellac and polyamide, and to the coated long-keeping sausages and hard cheese obtainable by such method.

13 Claims, No Drawings

METHOD OF COATING LONG-KEEPING SAUSAGES AND HARD CHEESES

The present invention relates to a method for coating foods selected from long-keeping sausages having a natural or artificial sausage casing, and hard cheese, with a shellac/polyamide composition comprising shellac and polyamide in a water/ethanol solution, and to the foods coated with said shellac/polyamide composition which can be obtained by the method according to the invention.

In spite of their natural or artificial sausage casing, commercially available long-keeping sausages (=raw sausages) have the disadvantage that a measurable loss in weight occurs due to losses of juice of meat through the casing in connection therewith, these sausages are characterized by a fatty surface. In addition, the currently used casing which is insufficient in this respect causes a non-uniform coloring of the cross-section of the enclosed sausages from the interior of the sausage to the outer periphery which is clearly visible, especially when the first cuts are made in the sausages, in the form of a more or less broad discolored region formed at the interface to the casing. This formation of discolored outer regions, which is frequently perceivable without difficulty in salamis, is often even increased after the first cut is made.

Hard cheese is usually coated with a paraffin wax layer for preservation. After some time, however, the layer becomes brittle and cracked, and thus the purpose of preserving the enclosed hard cheese is no longer achieved. Further, in spite of the coating, there is often formation of discolored outer regions in the enclosed cheese.

Accordingly, it has been the object of the present invention to provide a method for coating the surfaces of long-keeping sausages and hard cheese with a coating composition which results in a uniform, smooth, transparent and sufficiently elastic coating on such foods which prevents the above described disadvantages from occurring. Further, the coating should exhibit a good adhesion to the surface of the mentioned foods.

The method should be simple and economic and enable a complete and durable coating to be provided on the above mentioned foods.

It has now been found that this object is achieved by a composition comprising, in water/ethanol solution:
(a) from 1 to 99% by weight of shellac; and
(b) from 99 to 1% by weight of at least one polyamide which is soluble in aqueous ethanol;
respectively based on the total amount of (a) and (b).

In particular, the invention relates to a method for coating foods selected from long-keeping sausages having a natural or artificial sausage casing, and hard cheese, with a durable and uniform coating of a composition comprising
(a) from 1 to 99% by weight of shellac; and
(b) from 99 to 1% by weight of polyamide;
by treating the surface of the sausages or cheese with a composition comprising, in water/ethanol solution:
(a) from 1 to 99% by weight of shellac; and
(b) from 99 to 1% by weight of at least one polyamide which is soluble in aqueous ethanol;
respectively based on the total amount of (a) and (b).

The composition may be used for coating long-keeping sausages having a natural or artificial sausage casing, and hard cheese, whereby long-keeping sausages are obtained which have a uniform, smooth, transparent and elastic durable coating comprising the shellac and the polyamide on their natural or artificial sausage casings, which coating firmly adheres to the natural or artificial sausage casing. The same applies to the coating of hard cheese; in this case, the coating is directly applied to the previously uncoated surface of the hard cheese.

In a preferred embodiment, the invention relates to the provision of a complete coating, i.e., applying the coating over the entire outer surface of the mentioned long-keeping sausages and hard cheese.

The coatable long-keeping sausages (=raw sausages) may be all kinds of soft to hard raw sausages (hard sausages), especially Ruegenwalder (Ruegenwalder Teewurst; a German soft raw sausage for spreading), salami or cooking salami (hard raw sausages).

As hard cheeses, all kinds of cheese known as hard cheese can be employed.

The shellac to be used according to the invention can be any commercially available shellac, in principle. However, dewaxed shellac decolorized with active charcoal is preferred. Shellac is very readily soluble in alcohol, especially ethanol or aqueous ethanol. As the shellacs which can be used according to the invention, there may be mentioned those, in particular, which are dewaxed and have a melting point in the range of from 65–85° C., a saponification number of 180–240, and a wax content of up to 0.5% by weight, preferably not more than 0.2% by weight.

The polyamides which are soluble in aqueous ethanol are synthetic linear. polyamides which have long been known and commercially available. Such polyamides are readily soluble in alcohols, e.g., ethanol, especially mixtures of ethanol and water (e.g., ethanol:water=80:20 parts by weight), i.e., in some cases in amounts of up to 50% by weight. "Soluble in ethanol" or "soluble in aqueous ethanol" refers to those polyamides which are soluble at a level of at least 5% by weight at the boiling temperature (1013 mbar, normal pressure) of ethanol or a mixture of ethanol/water.

In particular, the polyamides which are soluble in aqueous ethanol are polymers formed from
(a) (i) at least one $C_2$–$C_{18}$, preferably $C_4$–$C_{12}$, aliphatic, $C_4$–$C_{18}$ cycloaliphatic, $C_6$–$C_{18}$ aromatic or alkylaromatic di-, tri-, tetra- or pentaamine which may be substituted on at least one nitrogen atom with a straight or branched chain, cyclic or cycloaliphatic alkyl group having up to 8 carbon atoms or a $C_1$–$C_6$-alkylene-oxy-$C_1$–$C_6$-alkyl group;
(ii) at least one saturated aliphatic $C_4$–$C_{12}$ or aromatic $C_8$–$C_{20}$ dicarboxylic acid or $C_{28}$–$C_{44}$ dimer fatty acid; and optionally
(iii) at least one straight chain, saturated aminocarboxylic acid, preferably ω-aminocarboxylic acid, which contains from 4 to 20 carbon atoms, wherein the amino group may be substituted with a substituent as mentioned under (a); or
(b) the aminocarboxylic acid defined under (a)(iii) alone; or their respective derivatives which are suitable for amide formation.

"Their derivatives which are suitable for amide formation" means, in particular, the esters, nitrites, anhydrides, lactams, salts and adducts (e.g., diamine/diacid adduct) of the above mentioned compounds, provided they exist.

Typical representatives of the diamine are ethylenediamine, tetra-, penta-, hexa-, octa- or decamethylenediamine, 1,2-, 1,3- or 1,4-xylylenediamine.

Typical representatives of the dicarboxylic acid are succinic acid, glutaric acid, adipic acid, pimelic acid, suberic acid, azelaic acid, sebacic acid, nonane-, decane-, undecane- and dodecanedicarboxylic acid. However, cyclohexane-1,2-, -1,3- or -1,4-diacetic acid, isophthalic acid or terephthalic acid may also be mentioned.

Typical representatives of the aminocarboxylic acids are the ω-aminocarboxylic acids, especially 6-aminocaproic acid, 7-amino-heptanoic acid, 12-aminostearic acid or 4-aminocyclohexane-carboxylic acid.

The primary amino groups of the above mentioned compounds may be monosubstituted with alkyl or cycloalkyl groups which preferably contain not more than 6 carbon atoms. In particular, there may be mentioned methyl, ethyl, propyl, isopropyl, butyl, tert.-butyl, amyl or cyclohexyl groups.

The dimer fatty acids are those, in particular, which can be obtained by dimerizing soybean oil, linseed oil and other fatty acids obtainable from their glycerides. Preferably, the molar ratio of diamine (i) to dicarboxylic acid (ii) is 1:1, and the molar ratio of diamine to ω-aminocarboxylic acid (if any) can be between 4:1 and 1:20.

All the above mentioned types of polyamides which are soluble in aqueous ethanol, their properties and methods of their preparation are known from the literature. Reference is made, in particular, to the U.S. Pat. Nos. 2,285,009, 2,320, 088, 2,388,035, 2,393,972 and 2,450,940, the disclosures of which are incorporated herein by reference. Particularly preferred polyamides are the polyamides obtainable under the designation Elvamide® (commercial products of Du Pont), especially Elvamide® 8063.

Preferably, the composition according to the invention comprises from 99 to 10% by weight of shellac (a) and from 1 to 906 by weight of the polyamide which is soluble in aqueous ethanol (b), more preferably from 98.5 to 70% by weight of shellac (a) and from 1.5 to 30% by weight of the polyamide which is soluble in aqueous ethanol (b), respectively based on the total amount of shellac and polyamide [(a)+(b)].

The concentration (a+b) of shellac (a) and polyamide (b) in the water/ethanol solution according to the invention is between 1 and 60% by weight, preferably from 10 to 50% by weight, more preferably from 20 to 40% by weight, depending on the solubility and proportion of the components and considering the desired viscosity of the solution. For coatings with lower layer thicknesses on the long-keeping sausages, lower concentrations are sufficient; for the coatings on the hard cheese, higher concentrations may be employed in order to achieve higher layer thicknesses. The concentrations of polyamide and shellac in the solution may be up to 60% by weight.

The water/ethanol solvent in which the shellac and polyamide are dissolved according to the invention contains at least 50% by weight, preferably at least 70% by weight, and more preferably from 75 to 98% by weight of ethanol. However, the concentration of the ethanol will essentially depend on the respective solubility performance of the polyamide and can be adjusted by those skilled in the art depending on the requirements.

A particularly preferred composition is obtained by mixing a 40–60% by weight, especially 45–55% by weight, solution of shellac in ethanol (above 99% by weight of ethanol) with a 10–20% by weight, especially 12–18% by weight, solution of polyamide, especially Elvamide® 8063, in water/ethanol (ethanol:water=about 75:25 parts by weight, in a weight ratio of from 1:20 to 20:1, preferably from 1:10 to 10:1, more preferably 1:1.

The composition according to the invention may further contain up to 20% by weight, especially up to 15% by weight, based on the water/ethanol solution, of dyes and/or pigments, for example, titanium oxide or iron oxide, or for hard cheese, in particular, yellow and red pigments.

The composition according to the invention can be prepared by dissolving the individual components in aqueous ethanol or by mixing the respective solutions (in ethanol or water/ethanol) of the individual components. It may well be necessary to heat the water/ethanol solution for a complete dissolution of the individual components, preferably with stirring. In some cases, the heated solution may also be employed for coating the foods.

According to the method according to the invention for coating the long-keeping sausages having a natural or artificial sausage casing, and hard cheese, the surface of those foods is treated with the water/ethanol solution according to the invention. Such treatment may be effected by spraying or brushing the sausages or cheese with the optionally heated water/ethanol solution according to the invention, or the sausages or cheese are dipped therein.

After such treatment, the treated sausages or cheese are allowed to dry in air whereby a layer containing shellac and polyamide remains on the natural or artificial sausage casing of the long-keeping sausages or on the hard cheese, the proportion of shellac and polyamide in this layer being the same as that of the respective water/ethanol solution employed.

After said brushing, spraying or dipping of the products, the excess solution may also be drained, and the treated product may be passed through a suitable drying means in which the solvent evaporates in an air current at 10 to 50° C. depending on the nature of the product employed.

The coating remaining on the product is a uniform, firmly adhering, mechanically stable and transparent film which is also suitable for covering particularly problematic smooth surfaces, such as Ruegenwalder, in a firmly adhering, permanently smooth and transparent way.

The long-keeping sausages and hard cheese obtainable by the method according to the invention may have protective films with a layer thickness of up to 1 mm. However, for sausages, layer thicknesses of up to 0.5 mm, preferably up to 0.2 mm and more preferably up to 0.1 mm are recommendable, whereas the surface of hard cheese may be provided with a polyamide/shellac coating having a layer thickness of up to 0.7 mm, preferably up to 0.5 mm and more preferably up to 0.4 mm. The minimum layer thickness in either case is 0.001 mm, preferably 0.005 mm, more preferably 0.01 mm.

The mentioned layer thicknesses can be achieved by adjusting corresponding polyamide/shellac concentrations of the water/ethanol solution and thus the viscosity of the solution. However, this must be decided in each individual case and is essentially dependent on the kind of product to be coated.

The combination of shellac and polyamide for coating the above mentioned foods has the advantage, as compared to coating the foods with films of the respective polyamide solution alone, that the film according to the invention "skintightly" contacts the natural or artificial sausage casing on the surface of the sausage whereby contamination of the sausage surface in a space between the sausage surface and the polyamide film is avoided. Especially under warm temperature conditions, significant losses in quality may occur in the foods additionally coated with the polyamide film alone. The non-skintight adhesion of the polyamide film alone can result in accumulations of juice of meat between the sausage casing and the polyamide film.

With a shellac coating alone, the non-uniform discoloring of the enclosed sausages and cheese (formation of discolored outer regions) cannot be avoided.

The sausage and cheese products coated according to the invention are substantially less perishable and do not exhibit any formation of discolored outer regions in the enclosed sausage or cheese even after prolonged terms of storage. The coating adheres well to the surface of the sausage or cheese.

The invention will be described by the following Examples relating to the coating of a hard raw sausage (salami). The results obtained for the loss in weight over a given period of time and formation of discolored outer regions and taste are found to the same extent and in the same quality in the coating of other long-keeping sausages and hard cheese with the composition according to the invention. Therefore, the invention is not to be limited to this concrete example.

The taste and smell of the sausages coated according to the invention was rated with the best possible evaluation as compared to the uncoated sausages (Controls 1 and 2).

The uncoated sausages (Controls 1 and 2) were given a negative evaluation.

The coloring was defective, and the formation of a relatively large discolored region was observed reaching about 2 cm from the periphery of the sausage.

The taste was designated as unsatisfactory and rather too salty which is due to the high loss of juice of meat.

The following Table reports the results obtained:

TABLE

| ratio of solutions L to E (parts by weight) | L95/5E | L80/20E | L65/35E | L50/50E | L45/55E | L30/70E | L15/85E | L5/95E | Control 1 | Control 2 |
|---|---|---|---|---|---|---|---|---|---|---|
| sausage weight w/o film (g) | 872.4 | 877.6 | 871.4 | 870.4 | 875.5 | 873.5 | 873 | 877.8 | 874.2 | 873.5 |
| sausage weight with film (g) | 875.7 | 881.2 | 874.4 | 873.2 | 878.7 | 876.3 | 876.5 | 880.9 | | |
| weight loss, %, 4th day | 1.6 | 1.66 | 1.9 | 2.2 | 2.65 | 3.25 | 3.5 | 3.85 | 6.1 | 5.45 |
| weight loss, %, 16th day | 3.8 | 3.95 | 4.75 | 5.05 | 6.05 | 6.85 | 8.2 | 10.3 | 15.7 | 15.4 |
| weight loss, %, 20th day | 4.1 | 4.3 | 5.1 | 5.25 | 6.9 | 7.5 | 8.7 | 11.9 | 18.9 | 18.3 |

EXAMPLES

For performing the Examples described below, shellac (grade E904, melting temperature 65–85° C., acid number 65–80, saponification number 180–240, maximum wax content 0.2% by weight, maximum drying loss 2.0% by weight, commercial product of Wolff & Olsen, Hamburg) was used as a 50% by weight solution in ethanol (ethanol>99% by weight) (=solution L), and the polyamide Elvamide® 8063 was used as an about 15% by weight water/ethanol solution (ethanol:water=about 75:25 parts by weight) (=solution E).

For preparing the water/ethanol solutions comprising the shellac and the polyamide, solutions L and E were mixed in different weight ratios and optionally slightly heated until the solution was free of turbidity.

Fresh salamis (raw sausage with artificial sausage casing) of the same manufacturing date and of comparable weight from one manufacturer were used as the sausages to be coated.

The externally dry sausages were dipped into the respective alcohol solutions and were then kept suspended in the laboratory at normal room temperature until they were dry, i.e., for about 2 hours. Two sausages remained untreated for comparison (Controls 1 and 2).

Subsequently, the sausages were packed in cellophane and stored in cardboard boxes.

Weighing samples from the sausages were taken after 4, 16 and 20 days.

Evaluation of the Sausages

The sausages were cut and evaluated for color, smell and taste.

Delamination of the filmlike coatings according to the invention at the cut was not observed. The films adhere very well and could not be easily separated from the surface of the artificial sausage casing. In all cases, the coating of the sausages on the artificial sausage casing was uniform and closed as well as transparent.

Test Evaluation (after 20 days of storage)

The group of sausages coated according to the invention was given the best evaluation.

All sausages coated with the composition according to the invention exhibited an unusually positive coloring after being cut and did not show the least formation of a discolored outer region. This is due to the low loss of juice of meat.

What is claimed is:

1. A method for coating foods with a durable and uniform coating, said foods selected from the group consisting of meat products stuffed into a casing and hard cheese said method consisting of treating the food with a water/ethanol solution containing a shellac and a polyamide in the following proportions:
   a. from 1.0% to 99% by weight of shellac; and
   b. from 99% to 1.0% by weight of polyamide based on the total amount of shellac and polyamide, such that said meat product stuffed casing or hard cheese is coated with a composition containing from 1.0% to 99% by weight of shellac and from 99% to 1.0% by weight of polyamide based on the total amount of shellac and polyamide.

2. The method according to claim 1 in which the shellac and polyamide are present in the water/ethanol solution in a concentration of between about 1 and about 60% by weight.

3. The method according to claim 1 in which the water/ethanol solution contains at least about 50% by weight ethanol.

4. The method according to claim 1 wherein the water/ethanol solution contains a shellac and a polyamide in the following proportion:
   a. from 10%–90% by weight of shellac; and
   b. from 90%–10% by weight of polyamide.

5. A method according to claim 1 wherein the meat product stuffed into casing consists of soft to hard sausages and salami.

6. A method according to claim 1 wherein the shellac is dewaxed and has a melting point of between 65–85° C., a saponification number of 180–240 and a wax content of not more than 0.2% by weight.

7. A method according to claim 1 wherein the water/ethanol solution contains from about 75–98% by weight ethanol.

8. A method according to claim 1 in which the treatment solution further contains dye, pigments or a mixture of dyes and pigments.

9. A method according to claim 1 in which the food coated with the treatment solution is subsequently dried by contact with air having a temperature between 10° C. and 50° C.

10. A method according to claim 1 in which the food is treated with the water/ethanol solution by dipping, spraying or brushing the food with the solution.

11. The method according to claim 1 in which the food is treated with the water/ethanol solution until formation of an outer coating on the food of at least 0.1 mm.

12. A uniformly coated food selected from the group consisting of meat products stuffed into a casing and hard cheese wherein the coating is obtained by treating the meat product stuffed casing or hard cheese with a water/ethanol solution containing a shellac and a polyamide in the following proportions:
   a. from 1.0% to 99% by weight of shellac; and
   b. from 99% to 1.0% by weight of polyamide based on the total amount of shellac and polyamide, such that the coating contains from 1.0% to 99% by weight of shellac and from 99% to 1.0% by weight of polyamide based on the total amount of shellac and polyamide.

13. A method of reducing weight loss in meat products stuffed in casings, the outer surface of the meat product stuffed casing is coated with a water/ethanol solution containing a shellac and polyamide in the following proportions based on the total amount of shellac and polyamide;
   a. from 1.0% to 99% by weight of shellac; and
   b. from 99% to 1.0% by weight of polyamide such that the coating contains from 1.0% to 99% by weight of shellac and from 99% to 1.0% by weight of polyamide based on the total amount of shellac and polyamide.

* * * * *